United States Patent [19]

Eckl

[11] Patent Number: 4,821,049

[45] Date of Patent: Apr. 11, 1989

[54] SUBSTRATE TRANSPORT APPARATUS, ESPECIALLY FOR MAIL HANDLING

[75] Inventor: John K. Eckl, Norwalk, Conn.

[73] Assignee: Pitney Bowes Inc., Stamford, Conn.

[21] Appl. No.: 128,015

[22] Filed: Dec. 2, 1987

[51] Int. Cl.[4] .......... G01D 15/24

[52] U.S. Cl. .......... 346/134; 346/140 R; 400/56; 271/251; 271/274

[58] Field of Search .......... 346/140, 134; 400/56, 400/126, 579; 271/2, 252, 248, 251, 275, 274, 273, 272

[56] References Cited

U.S. PATENT DOCUMENTS

| | | | |
|---|---|---|---|
| 3,131,931 | 5/1964 | Fechkowsky | 271/252 X |
| 3,506,258 | 4/1970 | Lindquist . | |
| 3,550,351 | 12/1970 | Gombault . | |
| 3,869,986 | 3/1975 | Hubbard | 400/126 |
| 3,951,257 | 4/1976 | Storace et al. . | |
| 3,966,188 | 6/1976 | Maguire . | |
| 3,970,298 | 5/1976 | Irvine et al. . | |
| 3,988,017 | 10/1976 | Kyhl . | |
| 4,030,722 | 6/1977 | Irvine et al. . | |
| 4,030,723 | 6/1977 | Irvine et al. . | |
| 4,083,555 | 4/1978 | Irvine et al. . | |
| 4,144,786 | 3/1979 | Beard et al. . | |
| 4,170,350 | 10/1979 | Conti . | |
| 4,193,590 | 3/1980 | Mongagnino . | |
| 4,428,573 | 1/1984 | Denison | 271/251 X |
| 4,561,352 | 12/1985 | Svyatsky | 271/273 X |
| 4,620,807 | 11/1986 | Polit | 400/56 |
| 4,687,106 | 8/1987 | Prins . | |
| 4,705,413 | 11/1987 | Arnoldi | 400/56 |
| 4,744,554 | 5/1988 | Kulpa | 271/251 |
| 4,753,432 | 6/1988 | Freeman . | |

*Primary Examiner*—Joseph W. Hartary
*Attorney, Agent, or Firm*—Donald P. Walker; David E. Pitchenik; Melvin J. Scolnick

[57] ABSTRACT

A substrate transport apparatus includes a registration member and an apparatus for compliantly urging a substrate against the registration member such that the effects of thickness variations of and between each substrate transported past the registration member are mitigated.

22 Claims, 2 Drawing Sheets

SUBSTRATE TRANSPORT APPARATUS, ESPECIALLY FOR MAIL HANDLING

BACKGROUND OF THE INVENTION

The present invention generally relates to a substrate transport apparatus and, in particular, relates to such an apparatus having means for compliantly urging the substrate against a registration member.

The transporting of a substrate such as, for example, an envelope, past a given point such as, for example, a read or write mechanism, is a problem encountered in many industries. This particular problem is frequently encountered, for example, in the mail handling industry. Typically, in this industry, the problem is encountered whenever it is desirable to read from, or print upon, an envelope when that envelope is moving past a read or write device.

The problem is complicated in instances where the thickness of the envelope varies due, for example, to such factors as the number, size or thickness of the contents of the envelope. This thickness variation alone can cause numerous difficulties and itself is further complicated by the fact that such stuffed envelopes tend to roll at the edges when pressure is uniformly exerted thereupon. The basic complication results from the need to restrict the region that is to be printed upon, or read from, to specific locations required by, for example, a regulatory agency, such as, the United States Postal Service (USPS). In many facilities, for example, the USPS employs optical readers to more efficiently sort large quantities of mail pieces according to information printed on the surface of envelopes or information on inserts that are visible through the windows of windowed envelopes. However, to maximize the reliability of using such readers, certain parameters of the information so printed must be regulated to ensure that the location thereof falls within the optical reading field of the reader. Usually, the location of such information is referenced to one or more edges of the envelope, for example, the upper right hand corner and/or the bottom edge.

The problem is still further complicated by the fact that the exact position of, for example, one or more inserts within identical envelopes is not necessarily uniform. As a result, the thickness profile of each envelope within an otherwise uniform group of mail pieces can, and does, vary within that group. Hence, the amount of curvature of a reference edge of such an envelope is not predictable.

Historically, at least in the mail handling industry, proof of payment indicia has been printed upon mail pieces by postage meters having either a drum, carrying an engraved pattern thereon, or by stamping each mail piece with a platen having an engraved pattern thereon.

However, even with large numbers of these meters still performing satisfactorily, the relatively recent advent of electronically controlled printing techniques has, in some instances, becoming prevalent. Along with this advance has been the development of contactless printing techniques. One common contactless printing technique is the continuous ink jet printing.

In this technique, ink is continuously provided to a print head and, via the print head, is accurately directed to the surface of the substrate. Individual characters are formed in this technique by ejecting ink sequentially through a nozzle, i.e. each character is drawn individually. In such a technique, the distance between the ink jet print head and the substrate is not overly critical since the relative position of dots is fairly consistent, although certain limits nevertheless exist. One drawback of such an ink jet printer is the requirement for small mechanical tolerances of the interconnecting components to effectively draw the large number of requisite characters to be printed. In addition, high voltages and complex fluid handling systems are required. Consequently, such printers are rather expensive.

Conventionally, in the mail handling industry, the transport apparatus used with continuous ink jet printing mechanisms includes a movable, but nonetheless rigid, base plate. The base plate is usually designed to allow envelopes of different thicknesses to pass thereacross while exerting pressure that is uniform across the envelope thereupon so that the envelope surface falls within the printing accuracy tolerance of the continuous ink jet print head.

A less expensive contactless printing technique is generally known as the drop-on-demand ink jet printing head. This arrangement is generally less expensive because drops are merely ejected from a multiplicity of nozzles rather than the directed stream from the nozzle used in a continuous ink jet arrangement. Characters are formed by the relative movement of the array of nozzles and by allowing drops from preselected ones of the openings. That is, in the drop-on-demand technique, characters are formed dot per dot or by numbers of dots at a time whereas in the continuous ink jet technique, the particular line constituting a particular character is formed by deflecting ink flowing from an opening. The deflecting means in conjunction with the requisite control of ink pressure incurs substantial expense in the continuous ink jet technique. The use of drop-on-demand techniques, however, has been somewhat limited because the print head therefor must be quite accurately positioned proximate the envelope surface to avoid the relative misplacing of dots and, hence, to ensure an adequate print quality. Thus, the use of such a printing technique exacerbates the problems inherent with envelope thickness variations. In fact, conventional envelope transport techniques effectively prohibit the use of the less expensive drop-on-demand techniques in mailing systems due to the complications resulting from the thickness variations of stuffed envelopes.

Consequently, there is a considerable need for a substrate transport apparatus that not only enhances the results of continuous ink jet printing techniques but also allows the reliable use of drop-on-demand ink jet techniques for printing on substrates that vary in thickness. Such a substrate transport apparatus clearly offers considerable savings to a large number of mail handling facilities.

SUMMARY OF THE INVENTION

Accordingly, it is one object of the present invention to provide a substrate transport apparatus that substantially overcomes the above recited complications and drawbacks.

This object is accomplished, at least in part, by a substrate transport apparatus having means for compliantly urging a substrate against a registration member.

Other objects and advantages will become apparent to those skilled in the art from the following detailed description of the invention read in conjunction with the appended claims and the drawings attached hereto.

DETAILED DESCRIPTION OF THE INVENTION

Figure 1:
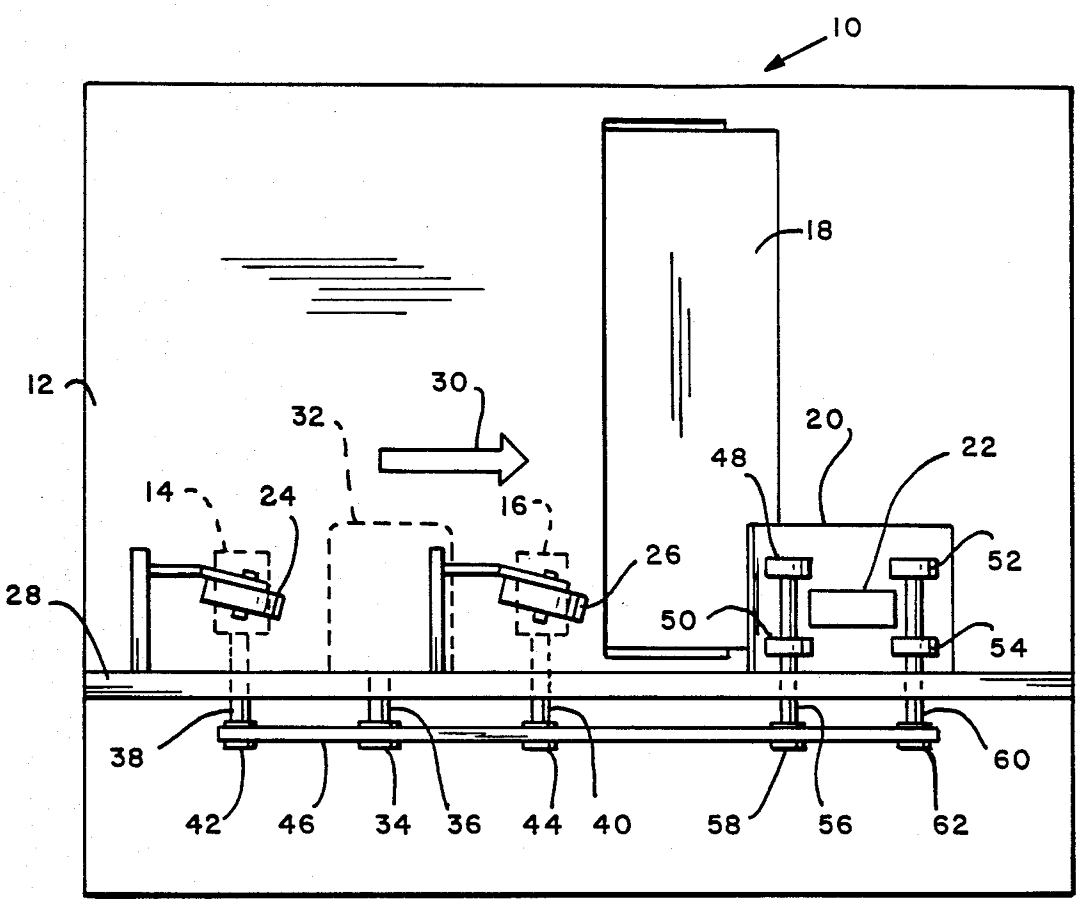
FIG. 1 is a plan view, not drawn to scale, of a substrate transport apparatus embodying the principles of the present invention.

A typical environment wherein the present invention is particularly useful is the system 10 shown in FIG. 1. The system 10 is exemplary only and is not intended to be limiting in any way with regard to the present invention. The system 10 can, in a mail handling environment, for example, be used to print information upon envelopes as envelopes are passed thereacross. Alternatively, the system 10 can be used to read information previously provided on such envelopes. The system 10 includes a deck 12 for supporting envelopes that are transported thereacross. Typically, an envelope is received from an associated mail preparation machine, not shown in the drawings, that delivers, for example, via conveyor belt, the envelope to the deck 12. The system 10 further includes first and second deck drive rollers, 14 and 16, respectively, that convey the envelopes upon the envelope being fed thereto along the deck 12. The first and second deck drive rollers, 14 and 16, respectively, convey the envelope across the deck 12 to a spring loaded ramp 18 having a compression means 19, such as a spring, allowing the ramp 18 to be depressed and thus, effectively, guide the envelope, regardless of the thickness thereof, beneath a fixed registration, or plate, member 20 and, thus, beneath, in this embodiment, a print head 22. In the preferred embodiment, the registration, or plate, member 20 includes a head viewing opening 21, shown in FIG. 4, wherethrough the print head 22 can print upon an envelope passing thereunder. Naturally, in an embodiment wherein the head 22 is adapted for optically reading information from the envelope, the opening 21 is made large enough to encompass the viewing field of the optical reader. Preferably, the system 10 is also provided with first and second deck idler rollers, 24 and 26, respectively, that are skewed, with respect to the direction of travel (indicated by the arrow 30 in FIG. 1) of the envelope passing across the deck 12, toward a stationary edge registration fence 28. The skewed deck idler rollers, 24 and 26, effectively guide each envelope against the stationary edge registration fence 28 that extends, in this embodiment, beyond and along both the deck 12 and the registration, or plate, member 20.

Preferably, the system 10 includes a drive motor 32 having a drive pulley 34 affixed to the drive shaft 36 thereof. Further, each deck drive roller, 14 and 16, is provided with a pulley shaft, 38 and 40, respectively, each pulley shaft, 38 and 40, having a pulley, 42 and 44, respectively, affixed thereto. In one typical system 10, the movement of the pulleys, 34, 42 and 44, and hence the deck drive rollers, 14 and 16, is coordinated by, for example, a belt 46 that is caused to move by the drive pulley 34. The belt 46, in this embodiment, also coordinates the movement of a plurality of registration drive rollers, 8, 50, 52 and 54. In the arrangement shown in FIG. 1 one pair of the registration drive rollers, 48 and 50, are mounted on a first registration drive shaft 56 having a first registration drive pulley 58 disposed thereon. Further, a second pair of registration drive rollers, 52 and 54, are mounted on a second registration drive shaft 60 having a second registration drive pulley 62 disposed thereon. Preferably, the registration drive rollers, 48, 50, 52 and 54, are disposed, with respect to the registration, or plate, member 20, to engage each envelope when that envelope is to be delivered to the print head 22. In this particular embodiment, as shown in FIG. 1, the first pair of registration drive rollers, 48 and 50, are disposed on one side of the registration, or plate, member 20 to engage envelopes prior to the envelopes reaching the print head 22. Further, the second pair of registration drive rollers, 52 and 54, are disposed to engage the envelopes after the leading edge of the envelope passes the print head 22. In this fashion, envelopes are delivered to the print head 22 and edge registered against the stationary edge registration fence 28 to allow the printing of desired information at a particular location upon the envelope, for example, with respect to the bottom edge thereof that contacts the stationary edge registration fence 28.

Figure 2:
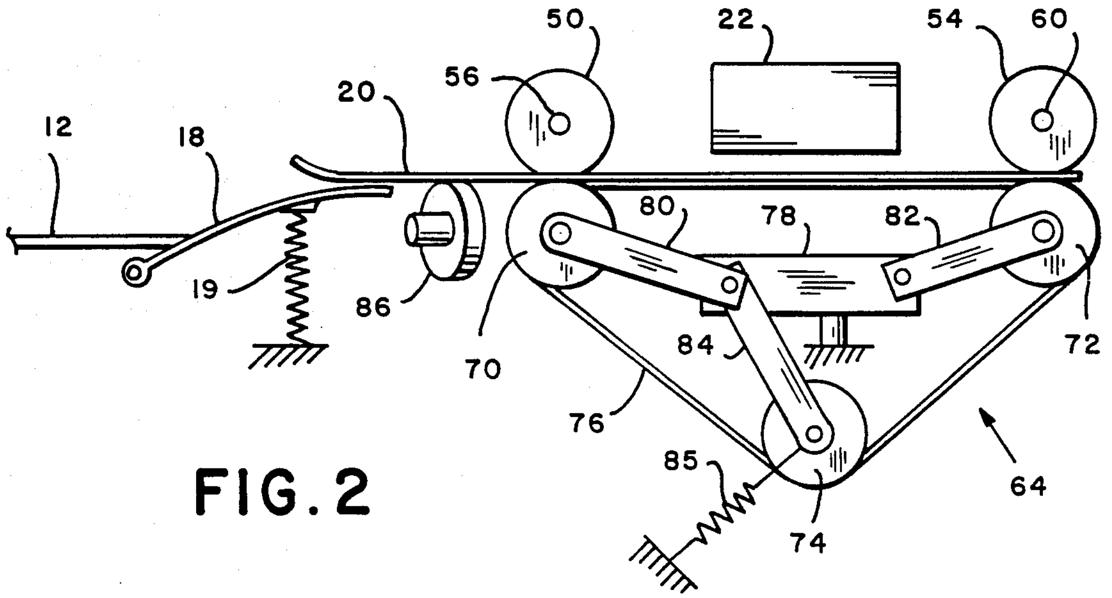
FIG. 2 is a side view, also not drawn to scale, of the apparatus shown in FIG. 1.
Figure 3:
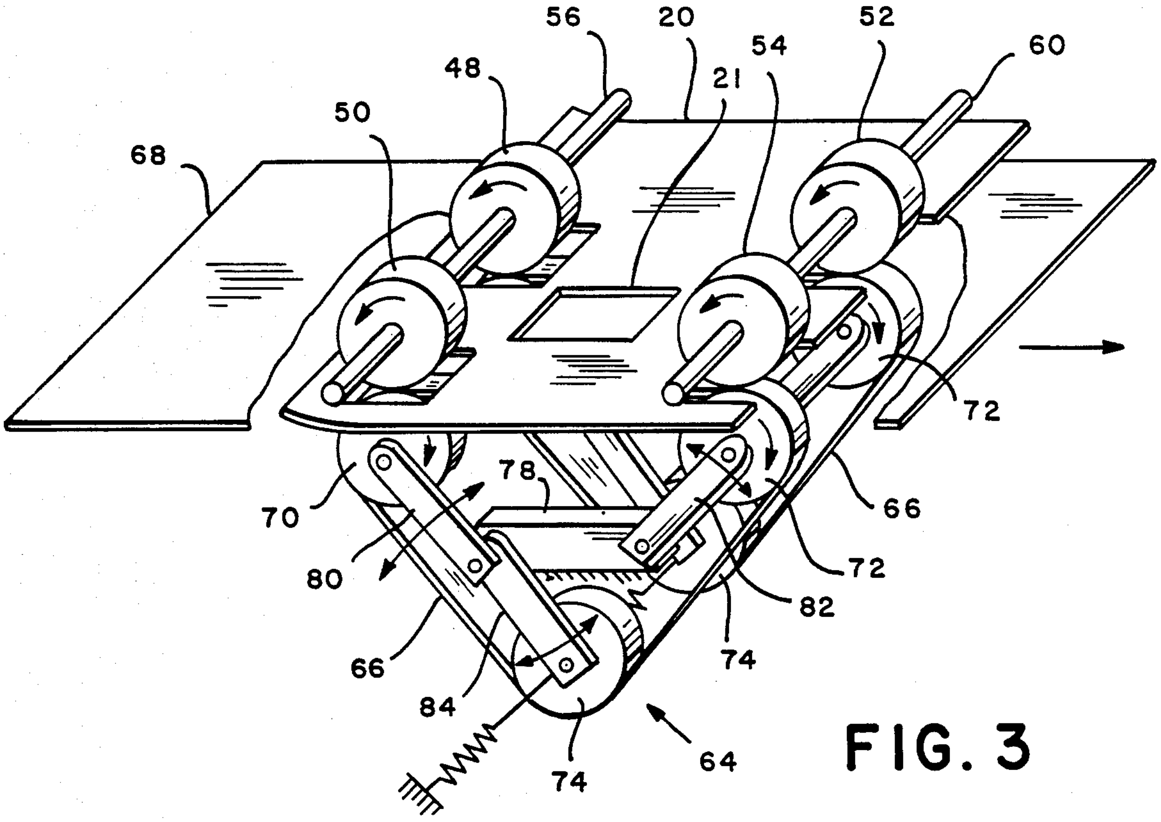
FIG. 3 is an illustrative pictorial view of a portion of a transport mechanism adaptable for use with the apparatus shown in FIG. 1.

A substrate transport apparatus, generally indicated at 64 in FIGS. 2 and 3 and embodying the principles of the present invention, includes a plurality of means 66 for compliantly urging a substrate, for example, an envelope (not shown), against the registration, or plate, member 20 such that the effects of thickness variations of, and between, each of the substrates are mitigated. For the convenience of the reader, elements previously discussed with respect to the system 10 shown in FIG. 1 are designated by the same reference numerals in FIGS. 2 and 3. Each of the compliantly urging means 66, in this embodiment, preferably includes first, second and third rollers, 70, 72 and 74, respectively, having a belt 76 disposed about the periphery thereof. In this preferred embodiment, each roller, 70, 72 and 74, is connected to a fixed member 78 via first, second and third rotatable members 80, 82 and 84, respectively. Each rotatable member, 80, 82 and 84, is affixed to the fixed member 78 at one end thereof and to one of the three rollers 70, 72 and 74, respectively, at the other end thereof.

In the preferred embodiment, the means 66 further includes a means 85 for maintaining the belt 76 in tension. As shown in FIG. 2, the belt tensioning means 85 functions to pull the third roller 74 away from the first and second rollers, 70 and 72, respectively. As a result, tension is introduced to the belt segments between the first and third rollers, 70 and 74, respectively, and the second and third rollers, 72 and 74, respectively. Tension on these two segments results in tension in the belt segment between the first and second rollers, 70 and 72, respectively. Since the first and second rollers, 70 and 72, respectively, are free to rotate with respect to the fixed member 78, the rotatable members, 80 and 82, tend to pivot toward each other. This action of forces maintains the belt segment between the first and second rollers, 70 and 72, respectively, taut to compliantly urge envelopes against the bottom surface of the registration member 20. In addition, the first and second rollers, 70 and 72, respectively, are urged and engage toward the registration drive rollers, 48, 50, 52, and 54, respectively, to ensure traction to move the intervening envelopes across the bottom of the registration member 20.

The apparatus 64 can further include a guide wheel 86 that, preferably, is spaced apart from the means 66 and preferably skewed with respect to not only the direction of travel of the envelope but also with a direction perpendicular therewith. Such a guide wheel 86 ensures that an envelope delivered to the registration member 20 maintains the edge thereof in a fixed relationship with the registration member 20, i.e., the rolling over of an edge of an envelope, while nevertheless in existence, remains substantially invariable during the traversal of the envelope past the print head 22.

In one preferred embodiment, the first and second rollers 70 and 72, respectively, of each urging means 66 are disposed in opposition to the registration drive rollers, 50 and 54. Further, as shown in FIG. 3, the registration member 20 is provided with openings 88 therethrough such that, the drive rollers, 48, 50, 52 and 54, extend therethrough to ensure engagement of an envelope passing thereunder. Hence, when an envelope is delivered to the registration member 20 such that the drive rollers, 48, 50, 52 and 54, engage the envelope, the compliant urging means 66 adjust to not only the thickness variations along the length thereof as it traverses the registration, or plate, member 20, but also independently adjust to the variation in thickness across the width thereof. Consequently, a compliant force is applied by the urging means 66 to, in this embodiment, at least four different points by the apparatus 64 as shown in FIGS. 2 and 3. Alternatively, as it will be understood by those skilled in the art from the discussion hereinabove, that each compliant urging means 66 of the apparatus 64 can include, minimally, only the first and second rollers, 70 and 72, respectively. In such a configuration, the first and second rollers, 70 and 72, respectively, would be independently rotatable and include an urging means, such as a spring, to exert a force against an envelope passing thereover as well as a means for maintaining the belt in tension. The third roller 74, although included in the preferred embodiment, is thus not strictly required to provide the desired compliant urging of the envelope against the registration, or plate, member 20.

Figure 4:
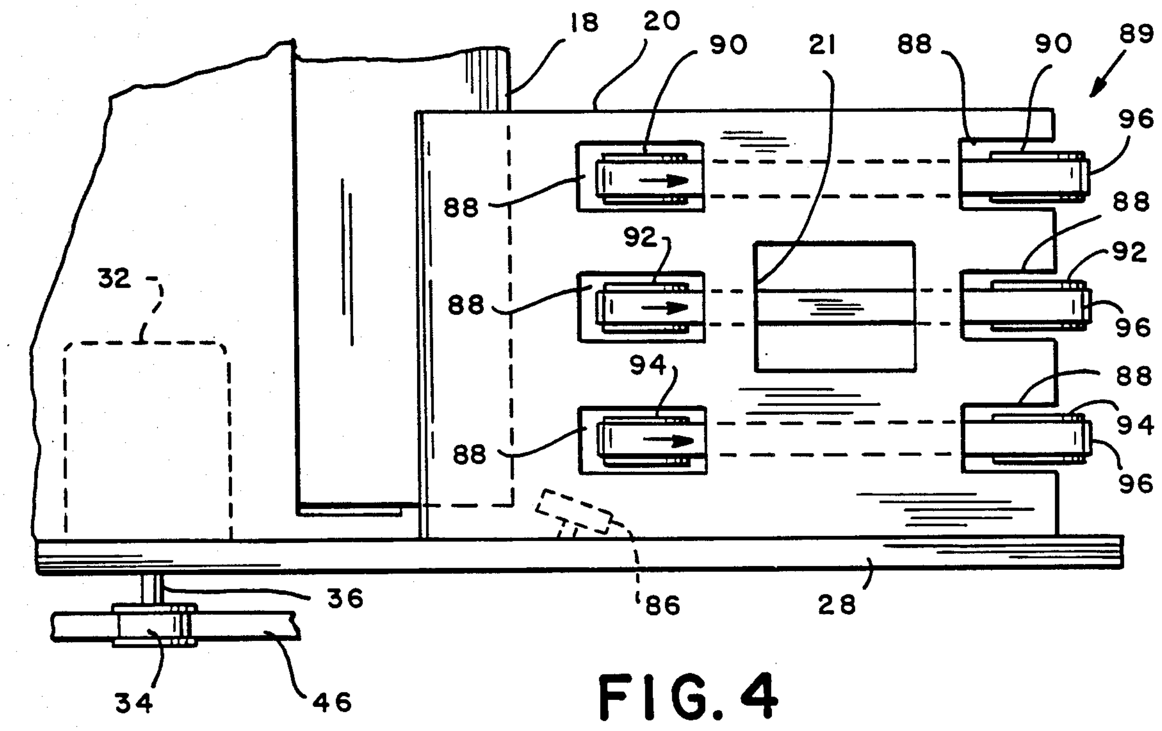
FIG. 4 is a plan view, not drawn to scale, of another substrate transport apparatus also embodying the principles of the present invention.

A further embodiment of the present invention includes the substrate transport apparatus 89 shown in FIG. 4 wherein elements previously discussed are designated by the same reference numerals. The apparatus 89 includes a plurality of means 66 for compliantly urging an envelope at six different points thereof during the traversal of the envelope beneath the registration, or plate, member 20. In this embodiment, the compliant urging means 66 includes three sets of rollers, 90, 92 and 94, that are disposed across the width of the registration member 20. Each set of rollers, 90, 92 and 94, includes a belt 96 about the periphery thereof. The use of three sets of rollers, 90, 92 and 94, as the compliantly urging means 66 provides envelopes passing thereunder with increased compensation for thickness variations across the width thereof. Additionally, a compliant urging force substantially directly opposing the read/write head 22 of the system 10 is specifically provided.

The apparatus, 66 and 89, discussed herein ensure that an envelope, regardless of the longitudinal and transverse thickness variations thereof, can be quite accurately positioned during the traversal thereof along the path of a read or write head. Hence, as a result, such technique as drop-on-demand printing can be used with excellent results. Further, the use of less tolerance sensitive techniques can be used with improved and more consistent results.

Although the present invention has been discussed and described herein with respect to specific embodiments, it will be understood that other arrangements and configurations may also be developed that, nevertheless, do not depart from the spirit and scope of the present invention. Hence, the present invention is deemed limited only by the appended claims and the reasonable interpretation thereof.

What is claimed is:

1. An envelope transport comprises:

a fixed plate member;

means for transporting envelopes along said plate member; and means for compliantly urging each of said envelopes against said plate member while being transported therealong, said means for compliantly urging said envelope including a plurality of independent envelope urging means, such that the effects of thickness variations of, and between, each said envelope are mitigated.

2. Apparatus as claimed in claim 1 further comprises:

means for reading from or writing upon said envelope, said reading or writing means being disposed such that said envelopes traverse the read or write field thereof.

3. Apparatus as claimed in claim 2 wherein said reading or writing means includes a contactless printing head.

4. Apparatus as claimed in claim 3 wherein said contactless printing head is a drop-on-demand printing head.

5. Apparatus as claimed in claim 2 wherein said plate member includes:

an opening, said reading or writing means being located on one side of said plate opposite said opening, said urging means being located on the opposite side of said plate, said opening being disposed such that the portions of said envelope traversing thereacross can be read from or written upon by said reading or writing means.

6. Apparatus as claimed in claim 1 further comprises:

means for guiding one edge of each said envelopes against said plate member such that any rolling of said one edge is made substantially uniform for each said envelope.

7. Apparatus as claimed in claim 6 wherein said guiding means includes a roller, said roller being skewed with respect to the direction of travel of said envelope.

8. Apparatus as claimed in claim 7 wherein said roller is also skewed with respect to a direction transverse to said direction of travel of said envelope.

9. Apparatus as claimed in claim 1 wherein said means for transporting envelopes past said plate member includes:

a first set of registration drive rollers, said first set of registration drive rollers being disposed on one side of a read or write head; and a second set of registration drive rollers, said second set of registration drive rollers being disposed on the other side of said read or write head such that said first set of registration drive rollers acts to feed said envelopes toward said head and said second set of registration drive rollers act to remove said envelopes from said head.

10. Apparatus as claimed in claim 9 wherein said plate member further includes:

a first set of openings, said first set of openings being cooperatively disposed with respect to said first set of registration drive rollers such that each said envelope is contacted by said first set of registration drive rollers; and a second set of openings, said second set of openings being cooperatively disposed with respect to said second set of registration drive rollers such that each said envelope is contacted by said second set of drive rollers.

11. Apparatus as claimed in claim 9 wherein said envelope transporting means further includes:

means for driving said first and second set of registration drive rollers.

12. Apparatus as claimed in claim 1 wherein said plurality of independent envelope urging means are disposed across the path of said envelopes and each of said plurality of independent envelope urging means is disposed along said path of said envelopes.

13. Apparatus as claimed in claim 12 wherein one of said plurality of independent envelope urging means is disposed opposing a read or write head position.

14. Apparatus as claimed in claim 1 wherein each of said plurality of independent urging means includes:

a first movable roller, said first movable roller being adapted to independently adjust to the thickness of said envelope while exerting an urging force thereagainst such that the portion of said envelope between said first movable roller and said plate member is urged toward said plate member; and a second movable roller, said second movable roller being adapted to independently adjust to the thickness of said envelope while exerting an urging force thereagainst such that the portion of said envelope between said second movable roller and said plate member is urged toward said plate member.

15. Apparatus as claimed in claim 14 wherein each of said plurality of independent urging means further includes:

a belt, said belt extending between said first and second movable rollers such that the portion of said envelope between said first and second movable rollers is compliantly urged toward said plate member, said urging being responsive to the thickness of said envelope.

16. Apparatus as claimed in claim 14 further comprises:

a read/write head for said envelopes;

first registration drive rollers, each said first registration drive roller being disposed opposing one of said first movable rollers, each set of opposing first registration drive roller/first movable roller being disposed on opposing sides of said plate member; and second registration drive rollers, each said second registration drive roller being disposed opposing one of said second movable rollers, each set of opposing second registration drive roller/second movable roller being disposed on opposing sides of said plate member, such that said first registration drive rollers act to feed said envelopes toward said head and said second registration drive rollers act to remove said envelopes from said head.

17. Apparatus as claimed in claim 14 further comprises:

a third movable roller, said third movable roller being disposed with respect to said first and second movable rollers to form a triangle thereamong.

18. Apparatus as claimed in claim 17 further comprises:

a belt, said belt extending about said first, second and third movable rollers such that the portion of said envelope between said first and second movable rollers is compliantly urged toward said plate member, said urging being responsive to the thickness of said envelope.

19. Apparatus as claimed in claim 18 further comprises:

means for urging said third movable roller away from the segment of said belt extending between said first and second movable rollers.

20. Apparatus as claimed in claim 19 further comprises:

a plurality of rotatable members, each said rotatable member being connected to one of said movable rollers at one end thereof and fixed at the other end thereof.

21. Apparatus as claimed in claim 20 further comprises:

a fixed member, said fixed member having said other ends of said rotatable members pivotably affixed thereto.

22. Apparatus as claimed in claim 16 further comprising means for driving the registration drive rollers, said first and second movable rollers being free to rotate.

* * * * *